Figure 1:
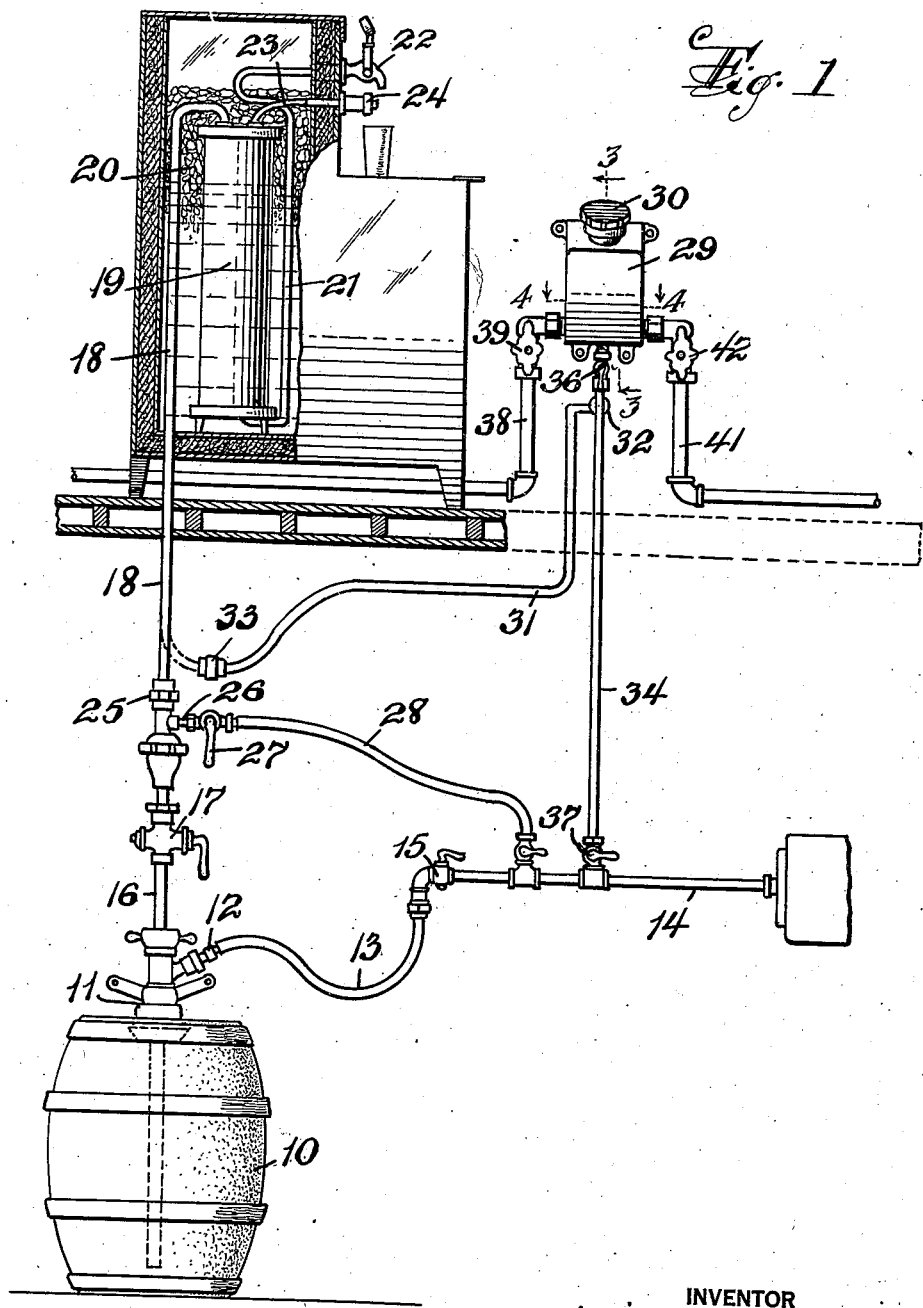

Nov. 25, 1941.    M. GUTTMAN    2,263,922
RECEPTACLE FOR CLEANING SOLUTION
Filed Dec. 16, 1938    2 Sheets-Sheet 1

INVENTOR
Milton Guttman,
BY
Wm. J. H. Caufield,
ATTORNEY

Nov. 25, 1941. M. GUTTMAN 2,263,922
RECEPTACLE FOR CLEANING SOLUTION
Filed Dec. 16, 1938 2 Sheets-Sheet 2
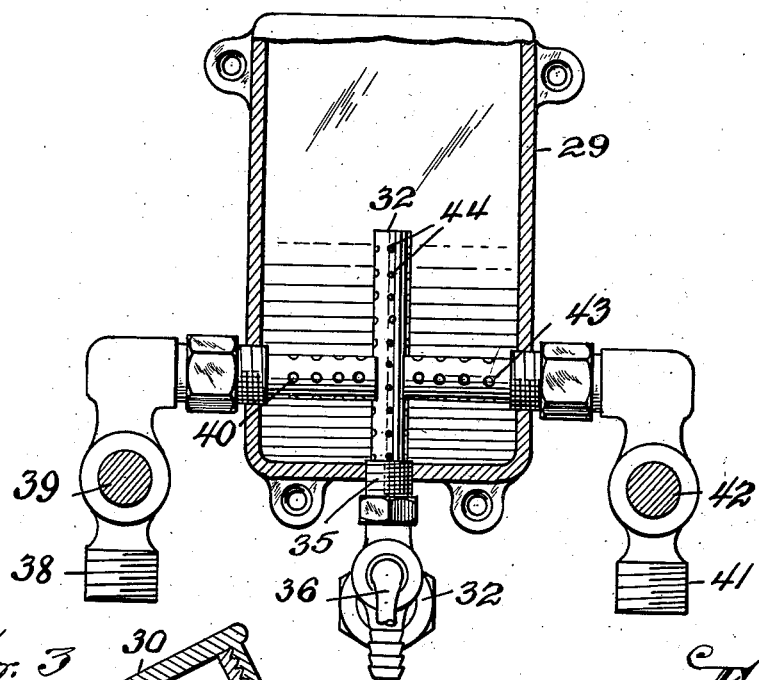
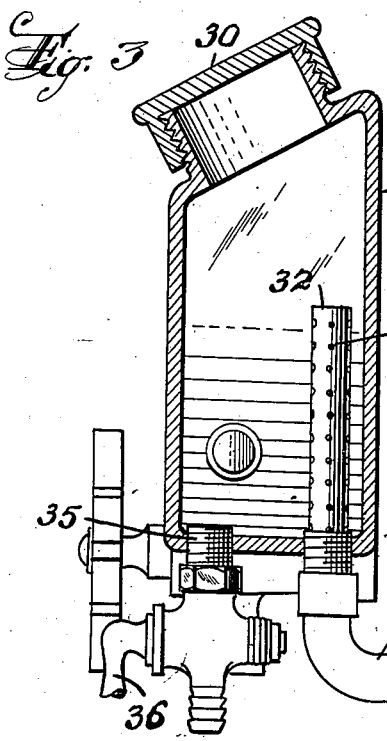
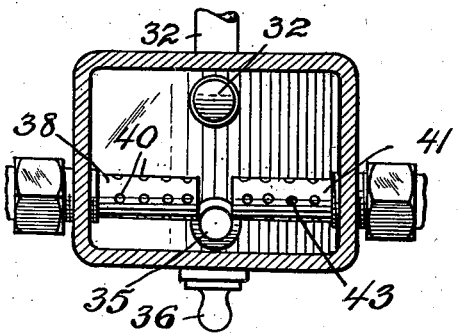
INVENTOR
Milton Guttman
BY
Wm H Caufield
ATTORNEY Patented Nov. 25, 1941

2,263,922

UNITED STATES PATENT OFFICE 2,263,922

RECEPTACLE FOR CLEANING SOLUTION

Milton Guttman, Newark, N. J.

Application December 16, 1938, Serial No. 246,115

1 Claim. (Cl. 225—12)

This invention relates to an improved system for cleaning the beer pipes and containers between the beer keg and the faucet. The system is devised primarily to accomplish the service of beer through the faucet until the system is empty of beer. This is economical as no appreciable amount of beer is wasted. The new system also avoids the necessity of returning beer to the keg which return effects the beer as the quality is not maintained if the beer is returned to the keg after it has once left the keg.

The invention also relates to an improved mixing chamber from which successive treatment of the beer line can be accomplished by hot water and chemical and cold water and then an emptying of the line for the renewed service of beer.

The system is convenient and easily operated which makes it possible to clean the line several times before a keg of beer is emptied. This is of advantage in places where only one or two kegs are dispensed in a week.

The invention is illustrated in the accompanying drawings in which Figure 1 is a diagrammatic view of a beer dispensing system in conjunction with my improved cleaning system. Figure 2 is a cross-section of a mixer used in the improved cleaning system. Figure 3 is a vertical cross-section taken on line 3—3 in Figure 1 and Figure 4 is a horizontal cross-section taken on line 4—4 in Figure 1.

The improved system can be incorporated in existing beer installations with but little change in the connections. In the drawings the keg is shown at 10 which is tapped as is usual by a tap 11 having the usual air connection 12 connected by a pipe 13 to the air line 14, the air being controlled by a valve 15. The tap also includes a beer pipe 16 which is provided with a beer valve 17 which is used to open or shut the keg from the beer line. The beer line in this specification refers to the elements between the beer tap and the faucet, such as beer pipes, cooler, coils or other parts. The form shown includes a beer pipe 18 which is fed from the tap 11 and the container or cooler 19. The cooler is placed in a refrigerating fixture such as the ice box 20. The beer passes from the cooler into the beer pipe 21 on the end of which is a beer faucet 22. An air vent pipe 23 with a valve 24 is installed to allow control of pressure on the beer in the cooler.

The beer pipe 18 is connected to the top of the tap 11 by a detachable connection 25 which is usually a screw connection and can be readily detached when the system or beer line is to be cleaned. The tap is also provided with a second air connection 26 provided with a suitable valve 27 and connected by a second air pipe 28 to the air line 14. It will be noted that the air connection 12 to the keg is below the beer valve 17 and the second air connection 26 is above the beer valve 17.

The cleaning attachment comprises a receptacle 29 with a cover 30 for pouring cleaning chemical or powder into the receptacle. The receptacle has a pipe or hose 31 which is connected to the outlet pipe 32 of the receptacle and is adapted for connection by a union 33 to the beer pipe 18 when the beer pipe 18 is disconnected from the top of the tap 11.

In addition to the air pipe 13 and the second air pipe 28 there is a third air pipe 34 from the air line 13 to the air inlet pipe 35 of the receptacle 29. The air inlet pipe 35 enters into the bottom of the receptacle 29. The third air pipe has a valve 36 for controlling the air to the receptacle in addition to a valve 37 at the air line although the latter is not essential.

A hot water pipe 38 enters the receptacle and a valve 39 controls the supply of hot water. The hot water pipe 38 enters part way into the receptacle and has small perforations 40. A cold water pipe 41 also enters the receptacle, has a valve 42 for controlling the cold water and projects part way into the receptacle with small perforations 43. The pipe 32 from the receptacle to the temporary attachment at 33 also projects into the receptacle and is provided with small perforations 44.

The operation of the device is as follows:

When the beer line is to be cleaned the beer valve 17 is closed. This leaves beer in the beer line 18, 19 and 21. The air line 28 is opened and the beer is under pressure in the beer line and can be dispensed through the faucet 22. When the beer line is practically empty, no beer having been wasted, the air valve 27 is closed.

The pipe 18 is now disconnected from the connection 25 of the tap 11 and connected, as at 33, to the cleaning pipe 31. A cleaning compound, these compounds being usually granular, is placed in the receptacle 29 and the cover 30 replaced. The hot water faucet 39 is now opened and hot water enters the receptacle and dissolves the chemical and the solution passes out through the pipe 32 and pipe 31 to the beer line. The perforations in the pipes are for the prevention of chemical passing through unless dissolved. When the beer line is full of chemical the solution is allowed to stand, the hot water preventing caking of chemical. After the required time, usually say, ten minutes has elapsed the air valve 36, and also 37, if installed, is opened and the air under pressure forces all the chemical solution out of the pipe 31 and the beer line. After the ejection of the chemical solution the air line 34 is again shut off at valve 36. The system now needs flushing.

The cold water valve 42 is now opened and cold water passes through the receptacle 29, the pipe 31 and the beer line. After the flushing is completed the valve 42 is again closed. Then the air is again admitted to the receptacle by opening the air valve 36 and the cold water is ejected from the receptacle, the pipe 31 and the beer line. The cleaning process is now completed.

The coupling 33 is now separated, the beer pipe 18 is again connected to the tap at 25 and the beer valve 17 and the air valve 15 are again opened. The beer remaining in the keg is now free to be passed through the beer line and normal operation of the system is renewed.

This cleaning system provides for the dispensing of practically all the beer in the beer line after the keg is shut off from the line. This is a desirable economy as it is salable and under the same pressure as before the keg was shut off, this pressure coming through the second air line 28. This does not disturb the beer remaining in the keg and does not necessitate draining any beer in the beer pipe back into the keg.

The receptacle 29 is usually located in a convenient place near the bar thus allowing the treatment by solution and the flushing later to be accomplished without the necessity of descending to the cellar as is usually the case.

Various changes can be made in the size and proportion of parts without departing from the scope of my invention.

I claim:

In a beer dispensing system, a cleaning device comprising a receptacle for a chemical, a valved pipe connection entering the receptacle, a second valved pipe connection entering the receptacle, a valved air pipe entering the receptacle at the bottom thereof, an additional pipe connection for conducting fluid from the receptacle, all of said pipe connections, with the exception of the air connection, including perforated extensions, extending part way into said receptacle.

MILTON GUTTMAN.